Jan. 31, 1950 J. M. AUFIERO 2,495,883
HEATER
Filed Jan. 12, 1949 3 Sheets-Sheet 1

INVENTOR.
John M. Aufiero
BY Duell and Kane
ATTORNEYS

Jan. 31, 1950 J. M. AUFIERO 2,495,883
HEATER
Filed Jan. 12, 1949 3 Sheets-Sheet 2
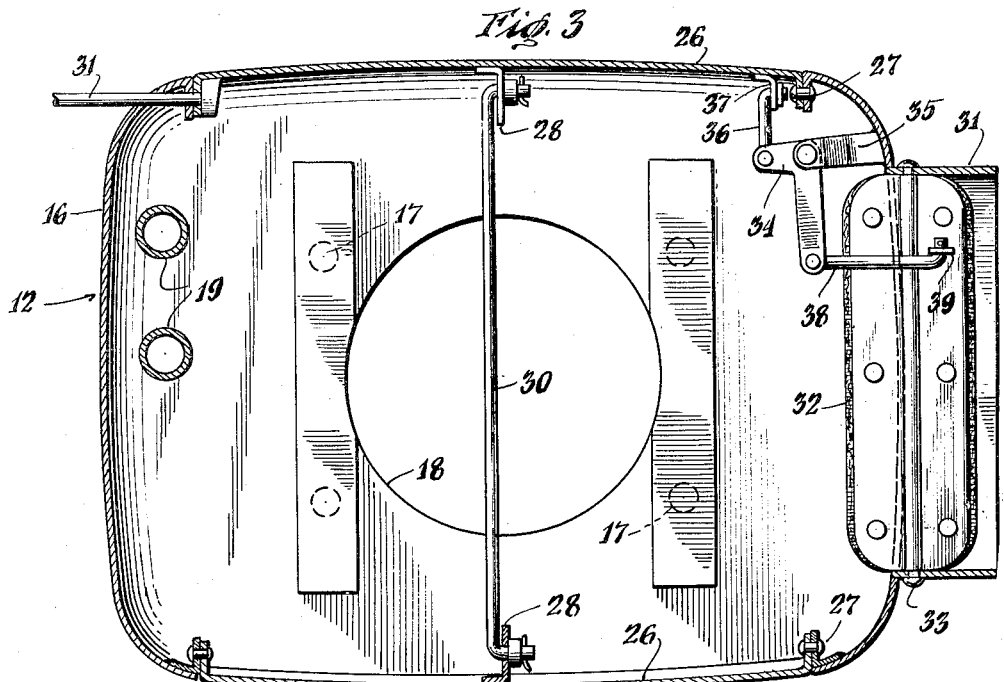
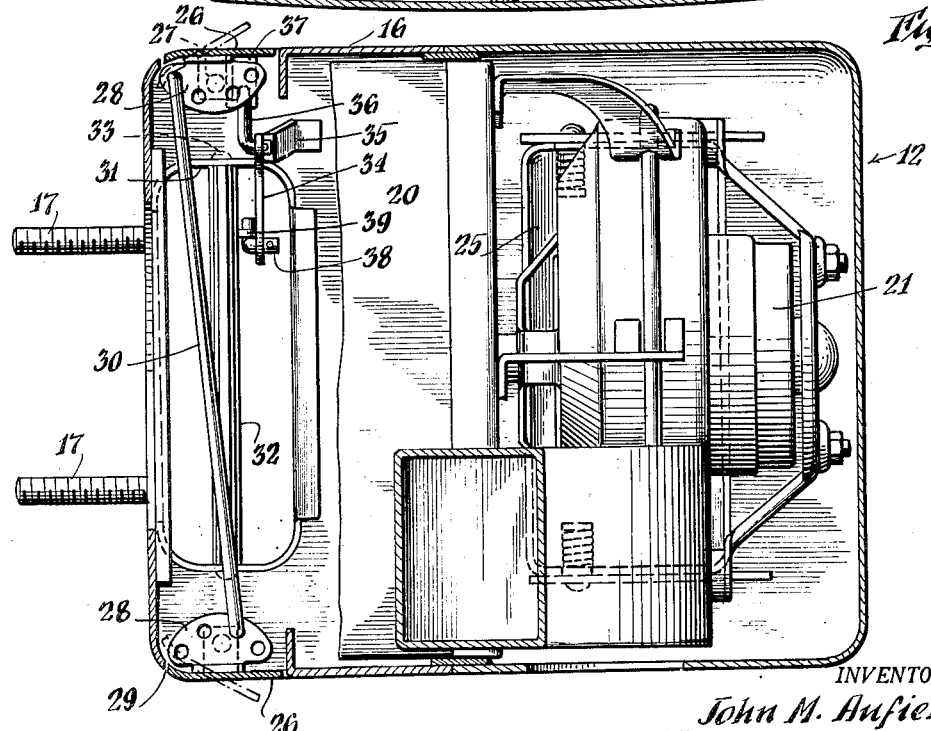
INVENTOR.
John M. Aufiero
BY Duell and Kane
ATTORNEYS Jan. 31, 1950 J. M. AUFIERO 2,495,883
HEATER
Filed Jan. 12, 1949 3 Sheets-Sheet 3

INVENTOR.
John M. Aufiero
BY Duell and Kane
ATTORNEYS

Patented Jan. 31, 1950

2,495,883

UNITED STATES PATENT OFFICE 2,495,883

HEATER

John M. Aufiero, Plandome, N. Y., assignor to E. A. Laboratories, Inc., Brooklyn, N. Y., a corporation of New York Application January 12, 1949, Serial No. 70,527

1 Claim. (Cl. 98—2)

This invention relates to a structurally and functionally improved heater and especially a heat for use in vehicles such as automobiles.

It is an object of the invention to provide an improved apparatus of this type and by means of which fresh air may be drawn at the option of the user for example from either the front end or side wall of a vehicle into the interior of the same. Accordingly if an operator finds himself in traffic where the exhaust fumes of a preceding car are being drawn into his own vehicle he may draw air from a point adjacent the side wall of such vehicle and thus avoid contamination of the air.

A further object is that of providing an apparatus of this type and by means of which the fresh air may be either heated or else circulated through the interior of the vehicle without being warmed. Therefore it may serve to cool and ventilate such interior.

Among additional objects of this invention are those of providing a vehicle heater the controls of which may readily be adjusted by a relatively inexperienced person to assure satisfactory operation of the apparatus and in which by such adjustment, the air may be either circulated as described, or partially or wholly re-circulated.

Still another object is that of designing a unit of this type which will include relatively few parts, each individually simple and rugged in construction and capable of manufacture by quantity production methods; such parts when assembled operating over long periods of time with freedom from all difficulties.

With these and other objects in mind, reference is had to the attached sheets of drawings illustrating practical embodiments of the invention and in which.

Figure 2:
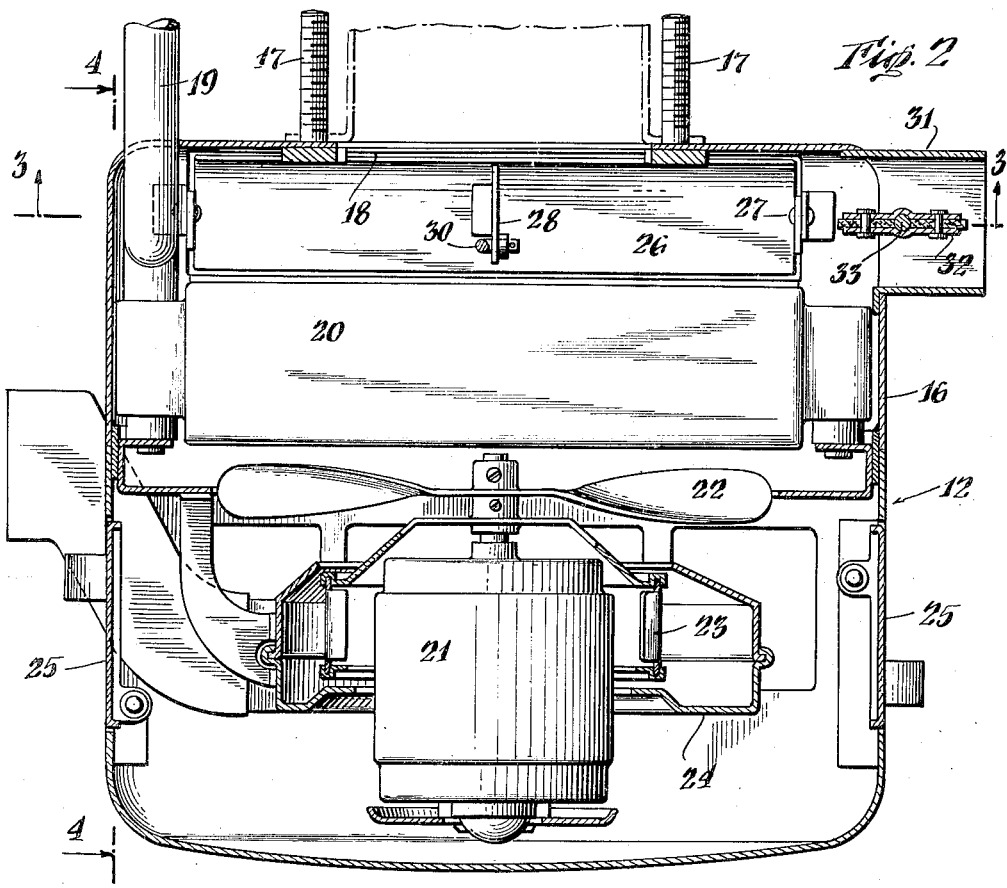
Fig. 2 is a sectional plan view of one form of heater embodying the structure of this invention.
Figure 5:
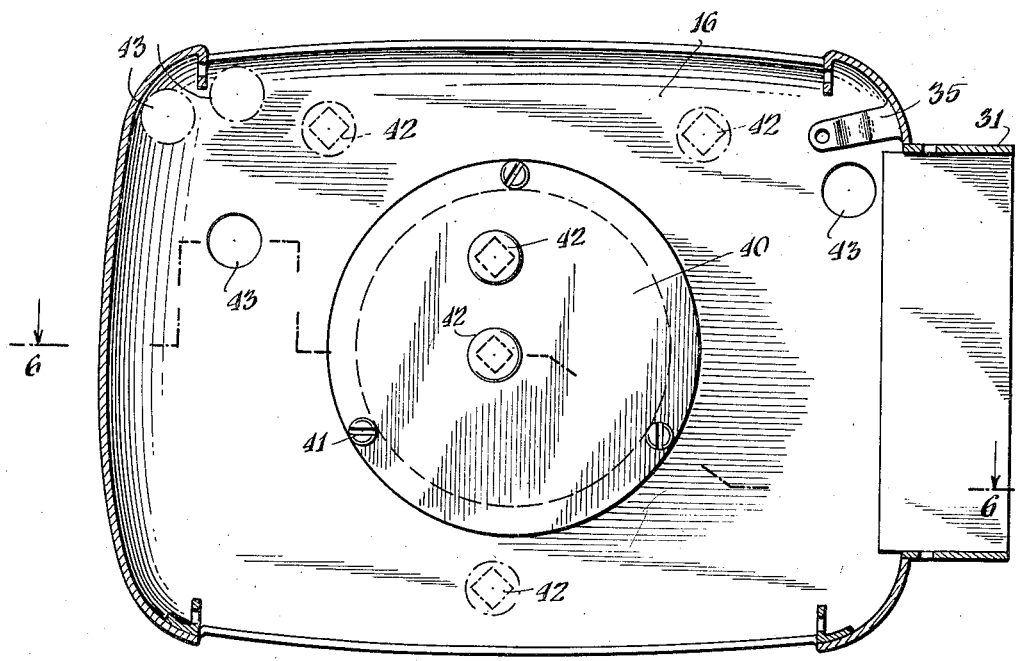

Figs. 3 and 4 are sectional views taken respectively along the lines 3—3 and 4—4 of Fig. 2 and in the direction of the arrows as indicated in that view;

Fig. 5 is a view similar to Fig. 3 but showing an alternative structure; and

Figure 6:
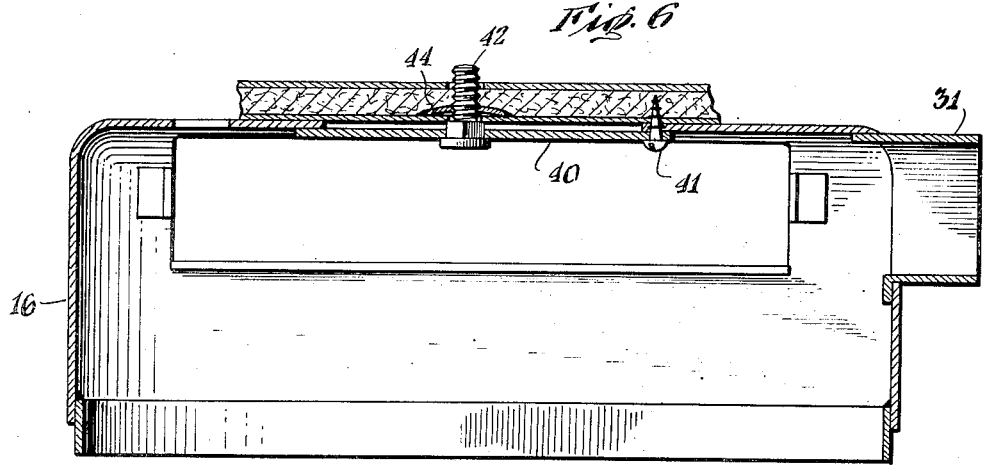

Fig. 6 is a transverse sectional view taken along the lines 6—6 and in the direction of the arrows as indicated in Fig. 5.

Figure 1:
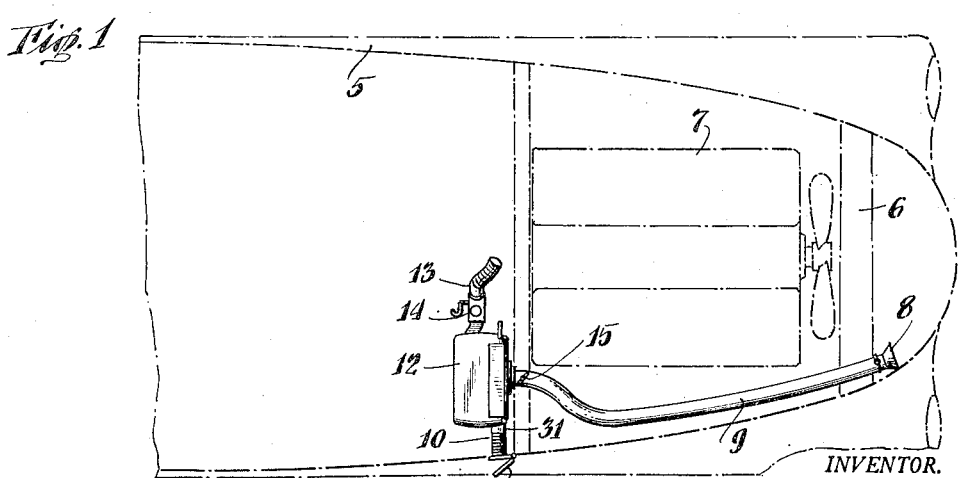
Fig. 1 is a diagrammatic plan view of the forward end of a motor vehicle and showing the heater therein.

Primarily referring to Fig. 1, it will be seen that the body of a motor vehicle has been indicated by the reference numeral 5. As shown, a radiator 6 is provided to the rear of which an engine 7 is disposed. A scoop or mouth portion 8 may be mounted in advance of the radiator 6 and be connected with a tube 9 which extends through the dash of the vehicle to supply uncontaminated fresh air to its interior. A tube 10 may also connect with a side opening in the vehicle body and which opening may be guarded by a louver 11. The tubes 9 and 10 are connected to a heater assembly generally indicated at 12 and which is coupled in a well known manner to, for example, the jacket of the motor 7 so that heated liquid within the latter may circulate through the heater. Also, in accordance with conventional construction, a tube 13 may be connected with the heater casing 12 to supply air for windshield defrosting purposes; the flow of air through this tube being conveniently controlled by a valve 14. Likewise a valve 15 may control the flow of air through tube 9.

As shown in Figs. 2, 3, and 4, the heater may include a casing 16 conveniently formed of sheet metal and reinforced where necessary to rigidify the parts. The casing includes upper and lower walls spaced from each other and connected by side walls. Inner and outer end walls also form a part of the casing and all of these walls may be integral with each other. Bolts 17 may extend from this casing to mount the latter upon the wall intervening the passenger and engine compartments of the vehicle. These bolts may also serve as mountings for the inner end of tube 9 which is aligned with opening 18 of casing 16 and is disposed in leakproof association therewith. Tubes 19 are connected with the core 20 of the unit and may be coupled to the cooling jacket of the engine block or blocks. In accordance with conventional procedure, valves (not shown) may be interposed in these tubes so as to control the flow of liquid therethrough.

A motor casing 21 may be disposed adjacent the inner wall of casing 16. The shaft of this motor mounts an impeller type fan 22 which may draw air through the interstices of core 20. A blower wheel 23 is also conveniently mounted by this shaft and disposed within a casing 24 to which is connected the tube 13 of the assembly. It will be appreciated that the afore described structure is merely illustrative and not to be interpreted in a limiting sense, as is likewise the provision of suitable pivoted doors or panels 25 which may be opened to a greater or lesser extent to control the discharge of air from the casing 16.

Preferably between the core 20 and the forward wall of casing 16 the latter is formed with a suitable number of openings. As shown, these are disposed in the upper and lower faces of casing 16. A flow of air through the same is controlled by panels or flaps 26 pivotally supported as at 27 with respect to the casing. These panels are interconnected for synchronized movement. Such connection is conveniently established by mounting arcuate ribs or plates 28 upon the inner panel faces and having such plates formed with an arcuate series of openings 29. The ends of a control rod 30 extend into these openings and thus connect the plates. It will be observed that the body of the control rod has its opposite ends extending to different sides of the line of pivoting as defined by the point of mounting 27 for the different panels 26. Therefore it is apparent that when one of the panels 26 is swung to increasingly open position, the opposite panel will be likewise shifted. Also, a simultaneous closing of these panels or flaps will occur. To shift the latter one of the same may have connected to it a shaft 31' which may be rotated.

As will be appreciated this shaft may be manually turned in any desired manner by crank, knob or otherwise. Likewise it may be controlled by suitable power apparatus. The same is true of the flap or louver 11 and valves 14 and 15 heretofore referred to.

Tube or passage member 10 may be connected to a collar 31 extending from the side wall of casing 16 and in line with the space intervening the inner face of the latter and the core 20. Within this collar a valve or panel 32 is rotatably mounted upon a shaft 33. A bell crank lever 34 may be pivotally supported upon a bracket 35 extending interiorly of the casing 16. One arm of this lever is connected by a link 36 with a bracket 37 affixed to one of the panels 26 and preferably that panel to which the operating shaft 31 is secured. The opposite arm or bell crank lever 34 is link-connected as at 38 with a bracket 39 secured to a face of the valve or plate 32.

As afore brought out, when one of the plates 26 is turned by, for example, the shaft 31', the second plate will be moved in synchronism. Accordingly, the plates will be simultaneously shifted to positions at which they increasingly clear or obstruct the openings of the casing within which they are disposed. As a consequence of the bell crank or equivalent functional connection of the plates 26, shifting to their opening-obstructing position, the plate or valve 32 will be shifted to a position at which it does not obstruct a flow of air through the collar or flange 31. Conversely as the plates 26 shift to a position where they do not obstruct the flow of air through the casing openings adjacent which they are disposed valve or plate 32 will swing to obstruct a flow of air through the passage with which it is associated.

As a consequence of the foregoing structure, it will be appreciated that if the heater is mounted in a motor vehicle and the tubes 19 of the core are connected so as to receive heated liquid, the interior of the vehicle will be heated with the motor 21 operating and the doors or flaps 25 open. If valve 15 is open fresh air will be drawn through the tube 9 from a point adjacent the forward end of the vehicle. With valves 26 closed this fresh air will be warmed by passage through the core 20.

If plates or valves 26 are partially open, then a certain amount of fresh air will be directly distributed to the interior of the vehicle while the balance of the air flowing through tube 9 passes through the core 20 and is heated. If the operation of the motor 21 is discontinued, then no air will be heated and all of the fresh cool air will be directly distributed within the vehicle interior. In the event that a forced circulation of this fresh, unheated air is desired, then, of course, the controls (not shown) which assure a circulation of liquid through the tubes 19 may be closed. Under these circumstances core 20 will remain cool and motor 21 may operate to distribute the air.

In the event that the operator finds that traffic conditions are such as to cause exhaust fumes from preceding cars to pass through tube 9, then valve 15 may be closed. As afore brought out, under these circumstances, valve 32 will open and fresh air will be drawn from the side wall of the vehicle through tube 10 into the passage defined by the collar or flange 31. This fresh air may be partially or completely warmed as described in the preceding paragraph. Also it may be distributed as fresh, unwarmed air. As heretofore brought out, the several controls for the valves, tunnels, etc. may be either purely mechanical and manually operated or else they may be semi-automatic or, in fact, completely automatic by connecting suitable controls to the same.

As will also be obvious, in the event collar 31 is not connected with a tube or duct 10, re-circulated air may be passed through the passage within which plate or valve 32 is disposed and according to the position of the latter. With valve 15 completely closed all of the air circulated through the heater will be air drawn from within the interior of the vehicle. With other adjustments of the parts various flows and desired results may be achieved.

As shown in Figs. 5 and 6 the front or inner wall of the casing 16 may mount a plate 40. When the latter is in position it preferably completely closes the opening 18. It may be thus mounted by screws 41. Bolts such as 42 may extend through the plate 40. Likewise as indicated in dot and dash lines, similar bolts 42 may extend through other portions of the inner casing wall and cooperate with nuts or retaining elements 44 of the "speed" type conveniently associated with the wall of the vehicle intervening the passenger and engine compartments.

A plate such as 40 will be employed where air is to be drawn solely through the collar 31. The position of the bolts 42 is merely suggestive. Obviously they may be disposed in other locations. This would depend largely upon the make of car to which the heater is being applied and the provisions which the manufacturer of the car has made for the mounting of the heater. Likewise, as suggested in Figs. 5 and 6, openings 43 may either be provided through the end wall of the casing or else scored or weakened areas may be furnished in that wall and through which pipes such as 19 may pass for supplying heated fluid to the core. Again the location of these openings and the pipes may, in many instances, depend upon the manner in which the mechanism of the car has been laid out. In any event, by following the structures suggested in Figs. 5 and 6, a heater unit is furnished which is capable of substantially universal application to various makes of motor vehicles.

Thus, among others, the several objects of the invention as specifically afore noted are accomplished. Obviously numerous changes in construction and rearrangement of the parts might be resorted to without departing from the spirit of the invention as defined by the claim.

I claim:

An apparatus of the character described including in combination a casing comprising spaced upper and lower walls, side walls between and connected to the edges of said upper and lower walls, inner and outer end walls at the ends of said casing and connected to said side, upper and inner walls, a heat exchange unit within said casing and spaced from said end walls, a motor driven fan operatively associated with said unit for causing a flow of air through the same towards said outer end wall, said casing being formed with openings between said units and outer end wall through which air will be discharged from said apparatus, one of said side walls and the upper and lower walls being formed with intake openings between said inner end wall and said unit, three panel members, one controlling the flow of air through each of said latter openings, means for pivotally mounting said panels substantially in line with their centers, a link having one of its ends connected to one side of the center of one of the pair of panels controlling the flow of air through the upper and lower wall openings to the other side of the center of the second of said pair of panels whereby they will both simultaneously open and close, a vertically extending bell crank pivotally mounted on the inner face of and adjacent the intake opening of said one side wall, a further link connecting the upper arm of said crank with the panel controlling the flow of air through said upper wall opening, an additional link connecting the lower crank arm with the panel controlling the flow of air through the opening in said one side wall, whereby said latter panel will pivot to obstruct the flow of air through the opening which it controls as said pair of panels are shifted to positions at which they do not obstruct a flow of air through the openings in the upper and lower walls and means connected to said pair of panels for pivoting the same.

JOHN M. AUFIERO.

REFERENCES CITED

The following references are of record in the file of this patent:

UNITED STATES PATENTS

| Number | Name | Date |
| --- | --- | --- |
| 1,746,985 | Bates | Feb. 11, 1930 |
| 1,903,037 | Fraver | Mar. 28, 1933 |
| 2,186,562 | Sperry | Jan. 9, 1940 |
| 2,221,391 | Young | Nov. 19, 1940 |
| 2,237,333 | Bretzlaff et al. | Apr. 8, 1941 |
| 2,237,452 | Samuels et al. | Apr. 8, 1941 |
| 2,237,477 | Colvin | Apr. 8, 1941 |
| 2,249,946 | Darrah et al. | July 22, 1941 |
| 2,304,643 | Hans | Dec. 8, 1942 |
| 2,355,151 | Findley | Aug. 8, 1944 |
| 2,377,094 | Meyerhoefer | May 29, 1945 |